United States Patent [19]

Weaver, Jr. et al.

[11] Patent Number: 5,594,718
[45] Date of Patent: Jan. 14, 1997

[54] METHOD AND APPARATUS FOR PROVIDING MOBILE UNIT ASSISTED HARD HANDOFF FROM A CDMA COMMUNICATION SYSTEM TO AN ALTERNATIVE ACCESS COMMUNICATION SYSTEM

[75] Inventors: Lindsay A. Weaver, Jr., Boulder, Colo.; Gwain Bayley; Edward G. Tiedemann, Jr., both of San Diego, Calif.; Klein S. Gilhousen, Bozeman, Mont.

[73] Assignee: Qualcomm Incorporated, San Diego, Calif.

[21] Appl. No.: 413,306

[22] Filed: Mar. 30, 1995

[51] Int. Cl.⁶ .................................... H04L 27/30
[52] U.S. Cl. .................. 370/331; 375/200; 375/206; 379/59; 379/60; 455/33.1; 455/33.2; 455/54.1; 370/335; 380/34
[58] Field of Search .................. 370/18, 94.1, 19, 370/21, 22, 93, 60, 95.3; 455/33.2, 33.1, 34.1, 34.2, 56.1; 379/60; 375/205; 380/34

[56] References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |
| 5,109,390 | 4/1992 | Gilhousen et al. | 375/1 |
| 5,184,347 | 2/1993 | Farwell et al. | 370/94.1 |
| 5,267,261 | 11/1993 | Blakeney, II et al. | 375/1 |
| 5,267,262 | 11/1993 | Wheatley, III | 375/1 |
| 5,278,892 | 1/1994 | Bolliger et al. | 379/60 |
| 5,295,153 | 3/1994 | Gudmundson | 375/1 |
| 5,305,308 | 4/1994 | English et al. | 370/32.1 |
| 5,416,797 | 5/1995 | Gilhousen et al. | 375/705 |
| 5,438,565 | 8/1995 | Hemmady et al. | 370/60 |

OTHER PUBLICATIONS

TIA document "CDMA Intersystem Operations" by Alejandro Holcman et al. Presented at IEEE Conference on Vehicular Technology Committee, Stockholm, Sweden, Jun. 8, 1994.

TIA TR45.2 Intersystems Operations Presentation "The Wideband Spread Spectrum Standard Under Development in TR45.5" by Edward G. Tiedemann, presented in Atlanta, GA, Nov. 16–20, 1992.

TIA document "Intersystem Operation With The Proposed Wideband Spread Spectrum Dual–Mode Mobile Station–Base Station Compatibility Standard" by Gadi Karmi et al, presented May 18, 1992 in Atlanta, GA, pp. 1–37.

TIA Document entitled "Alternative methods for Inter–Channel Handoff" by Charles Wheatley of QUALCOMM Incorporated, presented on Nov. 10–20, 1992 in Atlanta, Georgia, pp. 1–3.

TIA document entitled "Proposed Draft Liaison Statement to TR45.2" by Edward G. Tiedemann, Jr. of QUALCOMM Incorporated presented Dec. 3–11, 1992 in Phoenix, Arizona, pp. 1–32.

(List continued on next page.)

Primary Examiner—Melvin Marcelo
Assistant Examiner—Melissa Kay Carman
Attorney, Agent, or Firm—Russell B. Miller; Katherine W. White

[57] ABSTRACT

A method and system for providing a reliable means to perform handoff from a code division multiple access (CDMA) system using a pilot signal to an alternative access communication technique system. Simple pilot box circuitry is added to a set of border base stations. The border base stations are base stations which operate only in the alternative access communication technique and which have coverage areas which are contiguous with coverage areas of CDMA operation base stations. The mobile unit monitors for the pilot signal from the border base stations in the same manner as it monitors for pilot signals from the CDMA operation base stations. When the mobile unit detects the pilot signal corresponding to a border base station, it notifies a system controller in accordance with standard operation. The system controller is aware that the pilot signal corresponds to a border base station and thus triggers a hard handoff process to the alternative access communication technique system in response thereto.

13 Claims, 3 Drawing Sheets

OTHER PUBLICATIONS

TIA Document entitled "Intersystem issues for Support of the Wideband Spread–Spectrum Digital Standard" by Gadi Karmi of QUALCOMM Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and Voice Privacy", May 1993.

EIA/TIA Interim Standard entitled "Cellular Radiotelecommunications Intersystem Operations: Intersystem Handoff", Dec. 1991.

TIA/EIA Telecommunications Systems Bulletin entitled "IS–41–B Mobile Border System Problems", Apr. 1994.

TIA/EIA Telecommunications Systems Bulletin entitled "IS–41–B Support for Dual Mode Wideband Spread Spectrum Mobile Stations", Jan. 1994.

Gilhousen, K., Jacobs, I., Padovani, R., and Weaver Jr., L. "Increased Capacity Using CDMA for Mobile Satellite Communication", IEEE Journal on Selected Areas in Communications, vol. 8, No. 4, May 1990.

METHOD AND APPARATUS FOR PROVIDING MOBILE UNIT ASSISTED HARD HANDOFF FROM A CDMA COMMUNICATION SYSTEM TO AN ALTERNATIVE ACCESS COMMUNICATION SYSTEM

BACKGROUND OF THE INVENTION

I. Field of the Invention

The present invention relates to communication systems, particularly to a method and apparatus for performing handoff from a code division multiple access system to an alternative technology system.

II. Description of the Related Art

In a code division multiple access (CDMA) cellular telephone system or personal communications system, a common frequency band is used for communication with all base stations in a system. The common frequency band allows simultaneous communication between a mobile unit and more than one base station. Signals occupying the common frequency band are discriminated at the receiving station through the spread spectrum CDMA waveform properties based on the use of a high rate pseudonoise (PN) code. The high rate PN code is used to modulate signals transmitted from the base stations and the mobile units. Transmitter stations using different PN codes or PN codes that are offset in time produce signals that can be separately received at the receiving station. The high rate PN modulation also allows the receiving station to receive a signal from a single transmitting station where the signal has traveled over several distinct propagation paths.

In an exemplary CDMA system, each base station transmits a pilot signal having a common PN spreading code that is offset in code phase from the pilot signal of other base stations. During system operation, the mobile unit is provided with a list of code phase offsets corresponding to neighboring base stations surrounding the base station through which communication is established. The mobile unit is equipped with a searching receiver or element that allows the mobile unit to track the signal strength of the pilot signal from a group of base stations including the neighboring base stations.

A method and a system for providing a communication with the mobile unit through more than one base station during the handoff process are disclosed in U.S. Pat. No. 5,267,261, issued Nov. 30, 1993, entitled "MOBILE STATION ASSISTED SOFT HANDOFF IN A CDMA CELLULAR COMMUNICATIONS SYSTEM," assigned to the assignee of the present invention. Using this system, communication between the mobile unit and the end user is uninterrupted by the eventual handoff from an original base station to a subsequent base station. This type of handoff may be considered a "soft" handoff in that communication with the subsequent base station is established before communication with the original base station is terminated. When the mobile unit is in communication with two base stations, a single signal for the end user is created from the signals from each base station by a cellular or personal communication system controller.

Mobile unit assisted soft handoff operates based on the pilot signal strength of several sets of base stations as measured by the mobile unit. The Active Set is the set of base stations through which active communication is established. The Neighbor Set is a set of base stations surrounding an active base station comprising base stations that have a high probability of having a pilot signal strength of sufficient level to establish communication. The Candidate Set is a set of base stations having a pilot signal strength of sufficient level to establish communication.

When communications are initially established, a mobile unit communicates through a first base station and the Active Set contains only the first base station. The mobile unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the mobile unit. The mobile unit communicates a message to the first base station identifying the new base station. A cellular or personal communication system controller decides whether to establish communication between the new base station and the mobile unit. Should the cellular or personal communication system controller decide to do so, the cellular or personal communication system controller sends a message to the new base station with identifying information about the mobile unit and a command to establish communications therewith. A message is also transmitted to the mobile unit through the first base station. The message identifies a new Active Set that includes the first and the new base stations. The mobile unit searches for the new base station transmitted information signal and communication is established with the new base station without termination of communication through the first base station. This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The cellular or personal communication system controller receives this message through at least one of the base stations with which the mobile unit is communicating. The cellular or personal communication system controller may decide to terminate communications through the base station having a weak pilot signal strength.

The cellular or personal communication system controller upon deciding to terminate communications through a base station generates a message identifying a new Active Set of base stations. The new Active Set does not contain the base station through which communication is to be terminated. The base stations through which communication is established send a message to the mobile unit. The cellular or personal communication system controller also communicates information to the base station to terminate communications with the mobile unit. The mobile unit communications are thus routed only through base stations identified in the new Active Set.

Because the mobile unit is communicating with the end user through at least one base station at all times throughout the soft handoff processes, no interruption in communications occurs between the mobile unit and the end user. A soft handoff provides significant benefits in its inherent "make before break" handoff technique over conventional "break before make" techniques employed in other cellular communication systems.

New CDMA systems are typically initially deployed in areas with existing FM or other technology systems. The initial deployment of the CDMA system may be gradual and cover only a portion of an operating area covered by the original existing system. In such a case, as a mobile unit communicating in CDMA mode drives from the coverage area of the CDMA system to a portion of the system without CDMA coverage, a handoff from the CDMA system to the original system is needed in order to facilitate continuous communication. The process of mobile unit assisted soft handoff as described above is not possible between the CDMA system and the original system. The handoff from the CDMA system to the original system must be performed as a "break before make" hard handoff. When performing a hard handoff it is especially important to ensure that the handoff will be successful because a failed hard handoff typically results in a dropped call.

It is therefore the object of the present invention to provide a method and apparatus for performing handoff from a CDMA system to a system employing a different technology.

It is therefore a further object of the present invention to provide an inexpensive and reliable means of detecting entry into the coverage area of an alternate system.

SUMMARY OF THE INVENTION

The present invention defines a method and apparatus for performing handoff from a code division multiple access (CDMA) system using a pilot signal to a second independent system. A set of base stations form a border between CDMA operation and operation in the second system. The border base stations themselves operate only on the second system technology and are incapable of reception and demodulation of CDMA signals. A pilot signal is transmitted from the set of border base stations. As a mobile unit operating in the CDMA system approaches a border base station, it receives the pilot signal from the border base station. Just as the mobile unit would do upon reception of a pilot signal corresponding to a CDMA base station, the mobile unit reports the reception of the border base station's pilot signal to a system controller through the base stations with which it is currently in communication. The system controller is aware that the pilot signal corresponds to a base station incapable of CDMA operation. The system controller can communicate with the system controller of the second system and negotiate the availability of resources for the mobile unit in the second system. The CDMA system controller can forward the resource information corresponding to the second system to the mobile unit and order the mobile unit to handoff to the second system. The mobile unit then performs a hard handoff to the second system.

The pilot signal in the border base station in the present system is produced by a simple box which can be easily and cheaply installed in existing base stations. The pilot box requires only power to operate. The pilot box may also have a connection to a system controller for monitoring operation, configuration, and fault detection. The pilot box may also transmit a synchronization signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
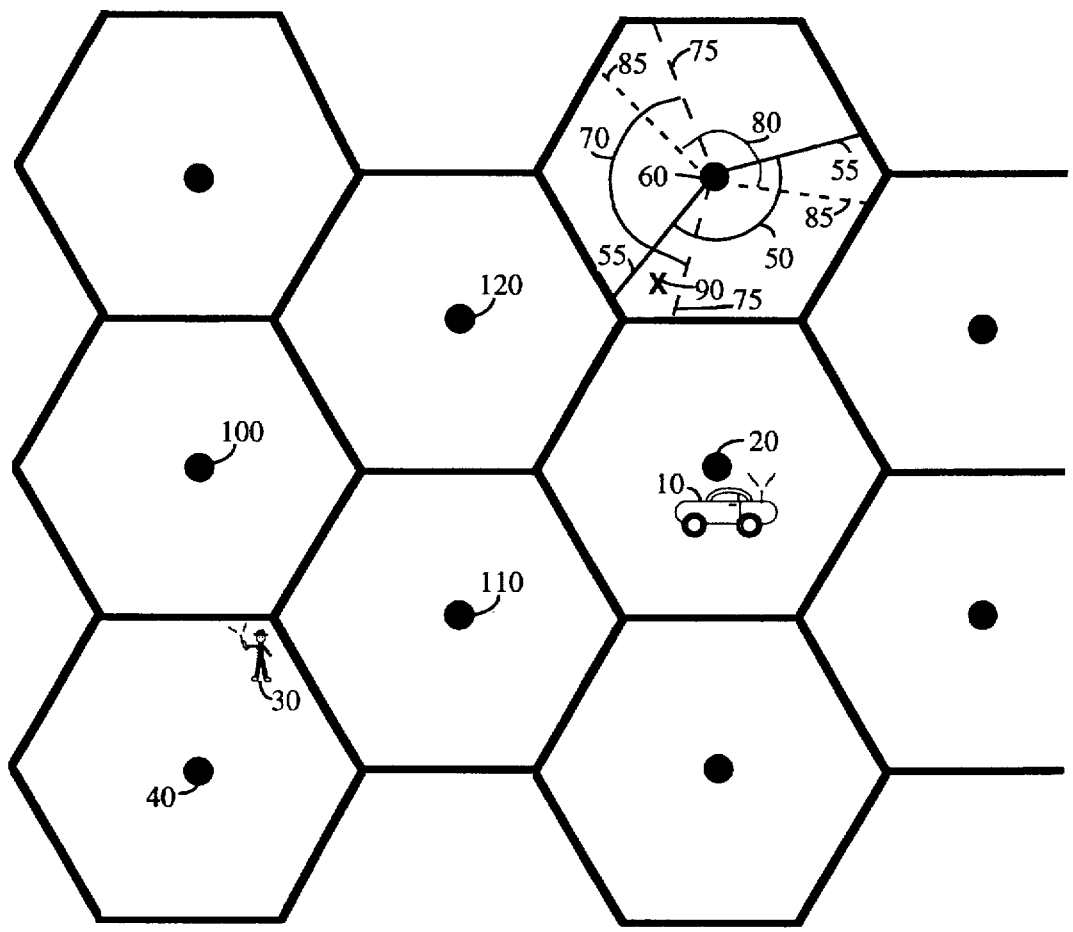
FIG. 1 illustrates an exemplary base station coverage area structure.

FIG. 1 illustrates an exemplary base station coverage area structure. In such an exemplary structure, hexagonal base station coverage areas abut one another in a symmetrically tiled arrangement. Each mobile unit is located within the coverage area of one of the base stations. For example, mobile unit 10 is located within the coverage area of base station 20. In a code division multiple access (CDMA) cellular or personal communication telephone system, a common frequency band is used for communication with all base stations in a system allowing simultaneously communication between a mobile unit and more than one base station. Mobile unit 10 is located very close to base station 20 and therefore receives a strong signal from base station 20 and relatively weak signals from surrounding base stations. However mobile unit 30 is located in the coverage area of base station 40 but is close to the coverage area of base stations 100 and 110. Mobile unit 30 receives a relatively weak signal from base station 40 and similarly sized signals from base stations 100 and 110. If each of base stations 40, 100, and 110 are capable of CDMA operation, mobile unit 30 might be in soft handoff with base stations 40, 100, and 110.

Figure 2:
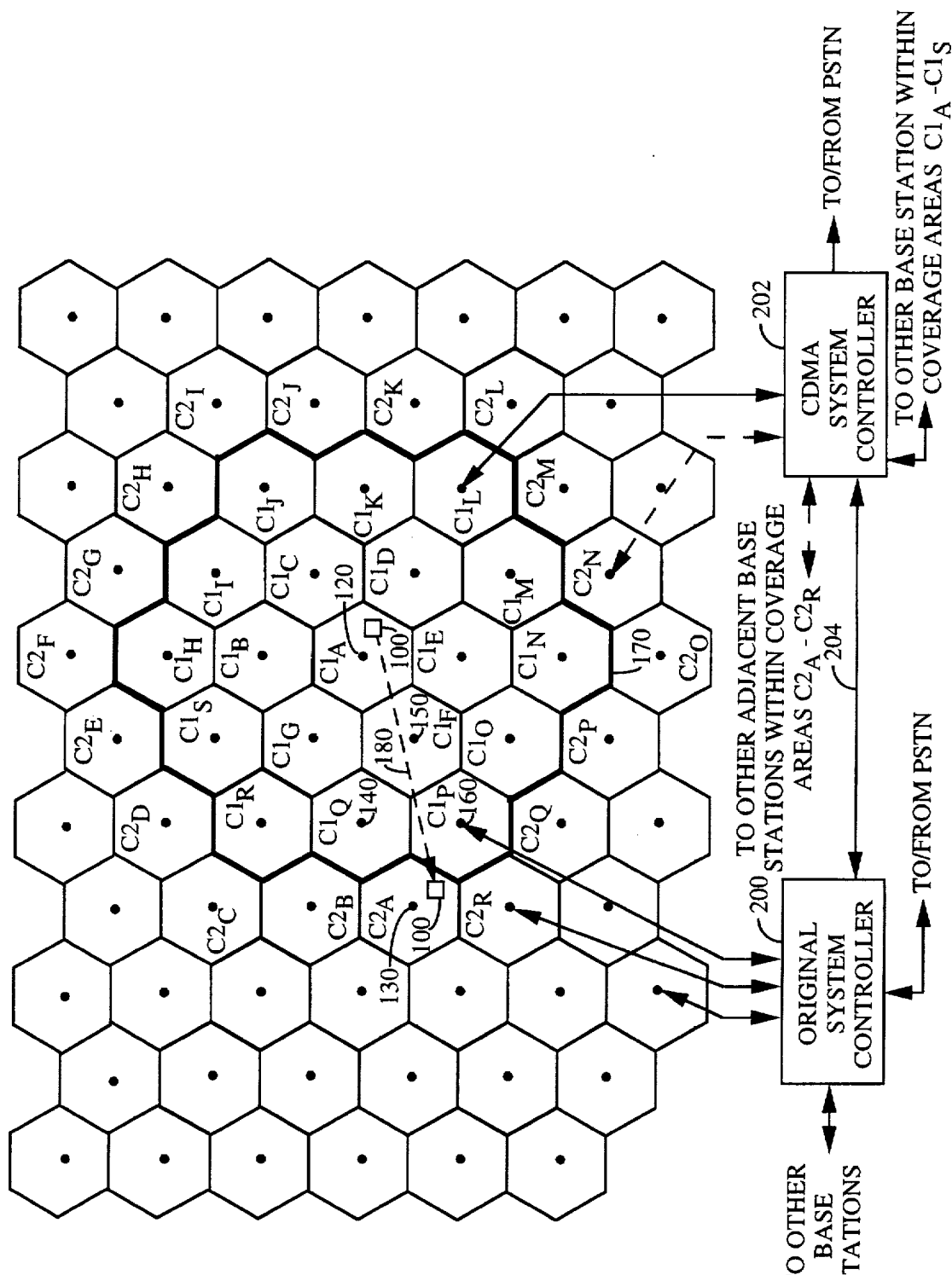
FIG. 2 illustrates an exemplary base station coverage area structure comprising the present invention.

The exemplary base station coverage area structures illustrated in FIG. 1 and FIG. 2 are highly idealized. In the actual cellular or personal communication environment, base station coverage areas may vary in size and in shape. Base station coverage areas may tend to overlap with coverage area boundaries defining coverage area shapes different from the ideal hexagon shape. Furthermore, base stations may also be sectored such as into three sectors, as is well known in the art. However base stations with lesser or greater numbers of sectors are envisioned. In a CDMA system each base station or sector of a sectorized base station transmits an identifying pilot signal.

Base station 60 of FIG. 1 represents an idealized three sectored base station. Base station 60 has three sectors, each of which covers more than 120 degrees of the base station coverage area. Sector 50, having a coverage area indicated by the unbroken lines 55, overlaps the coverage area of sector 70, having a coverage area indicated by the coarse dashed lines 75. Sector 50 also overlaps the sector 80, having a coverage area as indicated by the fine dashed lines 85. For example, location 90 as indicated by the X is located in both the coverage area of sector 50 and sector 70.

In general a base station is sectorized to reduce the total interference power to and from mobile units located within the coverage area of the base station while increasing the number of mobile units that can communicate through the base station. For example, sector 80 would not transmit a signal intended for a mobile unit at location 90 and thus no mobile unit located in sector 80 is significantly interfered with by the communication of a mobile unit at location 90 with base station 60. For a mobile unit positioned at location 90, the total interference has contributions from sectors 50 and 70 and from base stations 20 and 120. A mobile unit at location 90 may simultaneously be in soft handoff with base stations 20 and 120 and sectors 50 and 70.

A method for providing communication with a mobile unit through more than one base station during the handoff process is disclosed in U.S. Pat. No. 5,267,261 as described above. This type of handoff may be considered a "soft" handoff in that communication with the subsequent base station is established before communication with the original base station is terminated.

New CDMA systems are typically initially deployed in areas with existing FM or other technology systems. The initial deployment of the CDMA system may be gradual and cover only a portion of an operating area covered by the original existing system. For example FIG. 2 shows a system where coverage areas $C1_A$–$C1_S$ have base stations that are capable of CDMA operation. A typical deployment of a new CDMA system places the higher capacity CDMA capable coverage areas $C1_A$–$C1_S$ in high traffic areas such as a downtown area of a city. The lower traffic areas such as more suburban areas which can be supported by the lower capacity original system may not initially have CDMA capabilities. Coverage areas $C2_A$–$C2_R$ have original system base stations which are incapable of CDMA traffic channel communication.

To accommodate the CDMA system, a portion of the spectrum used by the original system is reserved for CDMA operation. The reservation of a portion of the spectrum implies that the base stations corresponding to coverage areas $C1_A$–$C1_S$ do not use the reserved spectrum for communications using the original technology. Likewise base stations corresponding to border coverage areas $C2_A$–$C2_R$ cannot use the reserved CDMA spectrum for communication using the original technology because of mutual interference with the CDMA system.

In a typical deployment, the base stations within coverage areas $C1_A$–$C1_S$ may also be capable of communication using the original technology. Thus a mobile unit with an established original technology call in coverage areas $C2_A$–$C2_R$ can continue to communicate as it moves into coverage areas $C1_A$–$C1_S$ without changing to CDMA operation. The base stations within coverage areas $C1_A$–$C1_S$ can support the call in the original technology following a standard handoff procedure used by the original technology system as controlled by original system controller 200. (Typically the original technology will use hard handoff techniques for all handoffs within the system.) However, when a mobile unit such as mobile unit 100 of FIG. 2 initiates a CDMA call and during the call exits coverage areas $C1_A$–$C1_S$, a hard handoff from the CDMA system to the original technology system is required to sustain uninterrupted communication.

The process of mobile unit assisted soft handoff as described above is not possible between the CDMA system and the original system. The handoff from the CDMA system to the original system must be performed as a "break before make" hard handoff. When performing a hard handoff, it is especially important to ensure that the handoff will be successful because a failed hard handoff typically results in a dropped call.

Border 170, indicated as a thickened black line in FIG. 2, represents the boundary between the CDMA capable base stations corresponding to coverage areas $C1_A$–$C1_S$ and the original system operation only base stations corresponding to adjacent coverage areas $C2_A$–$C2_R$. In FIG. 2, mobile unit 100 initiates a CDMA call with base station 120 of coverage area $C1_A$ and then moves in the direction indicated by arrow 180. Mobile unit 100 performs a soft handoff between base station 120 and base station 150 of coverage area $C1_F$ as directed by CDMA system controller 202. As mobile unit 100 enters coverage area $C1_P$, it is likely to be in soft handoff with base station 150, base station 160 of coverage $C1_P$, and base station 140 of coverage area $C1_Q$. As mobile unit 100 crosses border 170 and enters coverage area $C2_A$, a hard handoff to base station 130 and to operation in the original technology is performed. The present invention is an inexpensive and reliable method of ensuring that mobile unit 100 is securely within coverage area $C2_A$ and within range of base station 130 before a hard handoff is performed.

As described above, a mobile unit participating in an active CDMA call continually scans the incoming signal in search of pilot signals from neighboring base stations. If the mobile unit finds a pilot signal of a nearby base station of qualifying level, the mobile unit sends a message to CDMA system controller 202 indicating the detection of the signal. The present invention makes use of this existing process to facilitate hard handoff to the original system.

In the present invention, a simple "pilot box" is added to the original technology only base stations which are located in border coverage areas such as adjacent coverage areas $C2_A$–$C2_R$ of FIG. 2. The pilot box produces a pilot signal which in the preferred embodiment is the same as the pilot signal transmitted from the CDMA capable base stations where each base station transmits the pilot signal at a time offset unique to it.

Figure 3:
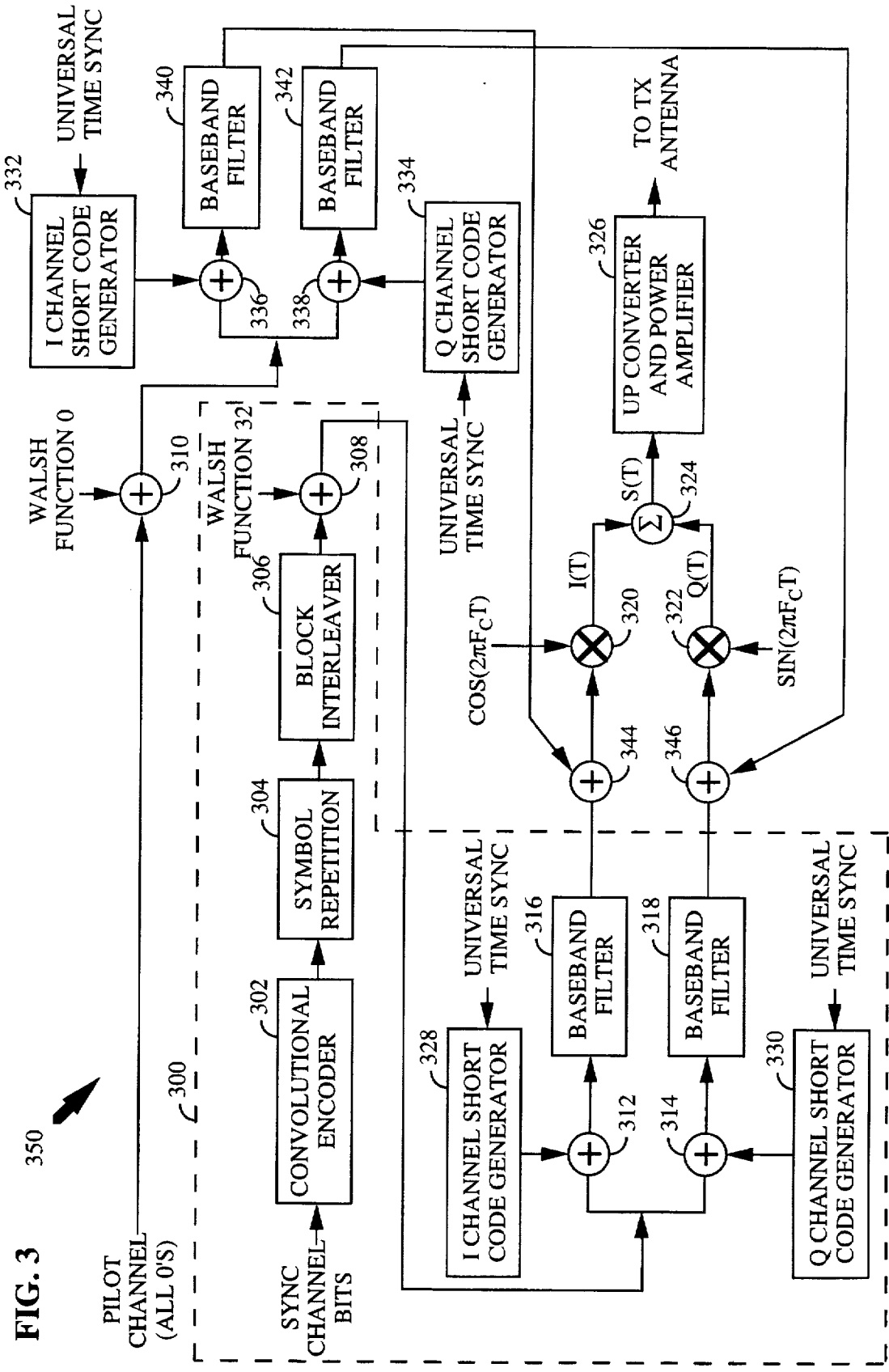
FIG. 3 illustrates an exemplary embodiment of the pilot box configuration.

FIG. 3 shows a preferred embodiment of the pilot box configuration. The pilot channel contains no data and therefore the pilot data input of pilot box 350 is all zeros. The Walsh function for the pilot channel is the Walsh zero function which is also all zeroes. Summer 310 sums the two zero sequences. (The function of summer 310 is exceeding trivial and is shown in FIG. 3 for explanatory purposes. In an actual implementation, summer 310 may not be included and the pilot channel sequence summed with the Walsh function could be implemented with a simple ground potential or logical '0' level.) The pilot sequence output of summer 310 is input into summer 336 such that the I channel short code pseudonoise (PN) sequence from I channel short code generator 332 is impressed upon the pilot sequence. The pilot sequence output of summer 310 is also input into summer 338 such that the Q channel short code pseudonoise (PN) sequence from Q channel short code generator 334 is impressed upon the pilot sequence. As noted above, in the preferred embodiment the I and Q channel short codes are the same for every base station in the system but offset in time from one another. To properly align the time offset, the pilot box needs the universal time input which is provided to each base station in the system. The output of summers 336 and 338 are filtered by baseband filters 340 and 342 respectively. Baseband filters 340 and 342 may also set the gain of the signal path. In typical implementations the pilot signal is transmitted at a higher gain level than other signals.

The output of baseband filter 340 is summed with any other optional I channel signals by summer 344 as explained in further detail below. Summer 344 is optional and is not needed if no other signals are provided. The output of summer 344 then modulated with a cosine wave by mixer 320. The output of baseband filter 342 is summed with any other optional Q channel signals by summer 346 as explained in further detail below. Again, summer 344 is optional and is not needed if no other signals are provided. The output of summer 346 is then modulated with a sine wave by mixer 322. The outputs of mixers 320 and 322 are summed by summer 324. The output of summer 324 is provided to upconverter and power amplifier 326 where the signal is upconverted to the carrier frequency and amplified. The output of upconverter and power amplifier 326 is the output of pilot box 350 which is transmitted from the antenna of the base station within which pilot box 350 is installed.

During CDMA system operation, the mobile unit is provided with a list of short code phase offsets corresponding to neighboring base stations surrounding the base station through which communication is established. This list may include the offset of the pilot signal of a base station in a border coverage area if the mobile unit is in close proximity to the border between CDMA operation and the original technology only operation. The searching element in the mobile unit tracks the signal strength of the pilot signals from the Neighbor Set in the same manner as described above without regard to the fact that some of the Neighbor Set members may be original technology only base stations.

When a pilot signal of a border base station in the Neighbor Set exceeds a qualifying level, the corresponding base station is added to the Candidate Set and removed from the Neighbor Set at the mobile unit. Referring again to FIG. 2, the pilot signal from base station 130 is detected by mobile unit 100 as it approaches the border of coverage area $C2_A$. Mobile unit 100 communicates a message through the base station or base stations with which it is in communication (most likely base stations 140 and 160) to CDMA system controller 202 identifying base station 130. System controller 202 recognizes that base station 130 has no CDMA capability and thus triggers a hard handoff process.

The actual hard handoff can result from a variety of stimuli. In other words, once system controller 202 has received the message from mobile unit 100 indicating reception of the pilot signal from base station 130, system controller 202 may use any of a variety of methods to choose when, and if, to handoff to the alternative system. System controller 202 may user a timer method to determine when to handoff. Alternatively system controller 202 may base handoff on signal strength measurements, or on the use of position location techniques. But in any case, if resources are available, original system controller 200 supplies information needed for handoff (e.g. the channel information for FM or channel and slot assignment for TDMA) to CDMA system controller 202. Original system controller 200 also notifies base station 130 to prepare for the handoff of mobile unit 100. CDMA system controller 202 sends the channel information to mobile until 100 through each base station with which mobile unit 100 is in communication. Mobile unit 100 receives the message and stops communicating through the CDMA base stations and begins operation in the original system mode with base station 130. Communication continues in the original system technology uninterrupted by the hard handoff.

If a mobile unit located in one of the border coverage areas $C2_A$–$C2_R$ is initially powered up, the mobile unit may first seek to find a CDMA pilot signal. The mobile unit finds the pilot box signal and then attempts to find a system information bearing synchronization channel signal, i.e., a sync signal. In the preferred embodiment, the pilot box does not transmit a sync signal and the mobile unit being unable to detect the sync signal after some time defaults to operation in the original system mode.

Pilot box 350 of FIG. 3 may therefore also contain a synchronization (sync) signal. The purpose of the sync channel in the preferred embodiment of a CDMA system is to allow mobile units within the coverage area of the corresponding base station to acquire initial time synchronization and system information such as the protocol revisions serviceable by the base station. When power is first applied to a mobile unit, it first seeks to find a pilot signal. Having found a pilot signal it seeks a corresponding sync channel. The sync signal provides information to the mobile unit indicating the minimum protocol revision level supported by the base station. Only mobile units having the minimum protocol revision level or a greater revision number may access the system.

In the second embodiment of the present invention the pilot box comprises circuitry to produce a sync channel shown as sync channel option box 300 of FIG. 3. The sync channel bits are first convolutionally encoded by convolutional encoder 302 to produce data symbols. The data symbols are repeated in symbol repetition 304. The repeated symbols are block interleaved by block interleaver 306. The interleaved data is modulated with a Walsh function sequence by summer 308. In the preferred embodiment 64 Walsh sequences are available and the sync channel is modulated with Walsh function 32 which is 32 zeroes (0's) followed by 32 one (1's.) The output of summer 308 is input into summer 312 such that the I channel short code from I channel short code generator 328 is impressed upon the pilot sequence. The pilot sequence output of summer 308 is also input into summer 314 such that the Q channel short code from Q channel short code generator 330 is impressed upon the pilot sequence. In the preferred embodiment the I and Q channel short codes are the same as the sequences used to modulate the pilot sequence. The output of summers 312 and 314 are filtered by baseband filters 316 and 318 respectively. Baseband filters 316 and 318 may also set the gain of the signal path. The output of baseband filters 316 and 318 are input into summer 344 and 346 respectfully and from there follow the same path as the pilot sequence to the transmit antenna.

Sync channel option box 300 can be used to prevent a stranded mobile unit in the event that the mobile unit does not switch into original system operation automatically if it is unable to acquire a sync signal. The sync channel bits in sync channel option box 300 can be set such that the minimum protocol revision level supported is set to the maximum value such that each mobile unit has a revision number lower than the minimum required. Thus upon powering up within the coverage area of a base station comprising a pilot box with the sync channel option, the mobile unit first acquires the pilot signal then acquires the sync channel and then examines the information from the sync channel which indicates that the mobile unit is unable to communicate with this base station in CDMA mode because its protocol revision is too old. The mobile unit then switches to the original technology mode of operation and is able to initiate or receive a call in that mode.

In yet another embodiment, pilot box 350 may comprise a connection to either original system controller 200 or CDMA system controller 202 (as shown by dashed lines in FIG. 2.) The connection would be a minimal data rate connection which monitors the condition of the operation pilot box 350 and possibly allows parameters to be set within pilot box 350. One of the major functions of such a connection would be to monitor for faults within pilot box 350 to facilitate the rapid detection and corrections of any fault condition which may arise.

The system in FIG. 2 assumes that the border base stations corresponding to coverage areas $C2_A$–$C2_R$ are single sectored base stations. In a standard situation, this generalization is probably true. The border base stations are typically located in more suburban areas where base station sectorization is not needed to accommodate the anticipated traffic load. However, as shown in FIG. 1, it is common that some base stations within a system are sectorized. In such a case, each sector of the original technology only base stations having a coverage area abutting the border outputs a pilot signal. Those sectors within the border base station which do not have coverage areas abutting the border would not need to transmit a pilot signal. In the most basic implementation, each sector of each border base station which abuts the border would have its own pilot box. However in an alternative preferred embodiment, a single pilot box would be provided for each base station even if the base station has multiple sectors abutting the border. In such a case multiple sectors of the same base station transmit the same pilot signal. When the mobile unit transmits a message indicating reception of the common pilot signal the system must use other methods to determine which sector of the base station the mobile unit is approaching. For example, the system is aware of the base station or base station sector with which the mobile unit is currently communicating and thus has some idea of the physical location of the mobile unit.

In yet an alternative embodiment, to implement a very high reliability system, two separate pilot boxes could be installed in each base station or sector. Each pilot box would transmit a pilot signal at the nominal offset assigned to that sector or base station. However one of the pilot box outputs is delayed from the other by a fixed amount. The fixed amount should be small with respect to the standard offset between neighboring base station such that the system maps the undelayed and delayed offset to the same base station. The fixed amount should be large enough to prevent interference of the delayed and undelayed pilot signals due to the multipath effects of the system. In this way the reliability of the system is increased in that if one pilot box fails, the other continues to provide the pilot signal for detection by the mobile unit.

There are many obvious variations to the present invention as presented including simple architectural changes. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a system for providing communication with at least one mobile unit, said system comprising a first plurality of base stations providing code division multiple access (CDMA) communication, wherein said first plurality of base stations are clustered physically together, said system further comprising a second plurality of base stations providing communication using an alternative access communication technique wherein said second plurality of base stations surrounds said first plurality of base stations thereby creating a border set of base stations wherein said border set of base stations is a subset of said second plurality of base stations wherein each base station in said border set has a coverage area with a contiguous boundary with a coverage area corresponding to a base station of said first plurality of base stations, a method for providing handoff from said CDMA communication to said alternative access communication technique comprising the steps of:

transmitting from each base station in said first plurality of base stations an identifying pilot signal and CDMA call signals in a first frequency band;

transmitting from each base station in said border set of base stations an identifying pilot signal in said first frequency band and alternative access communication technique call signals in a different frequency band;

measuring at a first mobile unit a pilot signal strength of each of said identifying pilot signals corresponding to a neighboring set of base stations wherein said neighboring set of base stations comprises base stations having coverage areas in proximity to said first mobile unit;

receiving at said first mobile unit a first pilot signal corresponding to a target base station wherein said target base station is a member of said border set of base stations and wherein said target base station is a member of said neighboring set of base stations;

transmitting a message from said first mobile unit to a CDMA system controller via at least one base station in said first plurality of base stations wherein said message indicates receipt of said first pilot signal; and initiating by said CDMA system controller an intersystem handoff procedure for said first mobile unit with an alternative access communication technique system controller, said CDMA system controller determining availability of resources among said second plurality of base stations through intersystem communication with said alternative access communication technique system controller during said intersystem handoff procedure.

2. The method of claim 1 further comprising the steps of:

communicating from said alternative access communication technique system controller to said CDMA system controller information for operation in said alternative access communication technique for said first mobile unit; and communicating said information for operation in said alternative access communication technique to said first mobile unit via at least one base station in said first plurality of base stations.

3. The method of claim 1 further comprising the step of transmitting from each base station in said border set of base stations a synchronization channel signal in said first frequency band.

4. The method of claim 3 wherein said synchronization channel signal comprises an indication of a minimum revision level supported by said border set of base stations and wherein said indication denotes a revision level incompatible with said first mobile unit.

5. The method of claim 1 wherein each base station in said first plurality of base stations which comprises multiple sectors transmits a different identifying pilot signal from each of said multiple sectors and wherein each base station in said border set of base stations which comprises multiple sectors transmits an identical identifying pilot signal in each of said multiple sectors having a contiguous boundary with a coverage area corresponding to a base station of said first plurality of base stations.

6. A cellular communication system for providing communication with at least one mobile unit, said system comprising:

a first plurality of base stations clustered physically together for providing code division multiple access (CDMA) communication signals wherein each base station of said first plurality of base stations transmits an identifying pilot signal and wherein said first plurality of base stations are controlled by a CDMA system controller;

a border set of base stations controlled by an alternative system controller in intersystem communication with said CDMA system controller wherein said border set of base stations is a subset of a second plurality of base stations for providing communication using an alternative access communication technique wherein said second plurality of base stations surrounds said cluster of said first plurality of base stations and wherein each base station in said border set has a coverage area with a contiguous boundary with a coverage area corresponding to a base station of said first plurality of base stations and wherein each base station of said border set comprises a self contained pilot generator for providing a transmit pilot signal apparatus comprising:

I channel short code generator means for receiving a universal time input and creating an I channel spreading sequence at a time offset;

a first baseband filter for receiving said I channel spreading sequence and providing a filtered I channel spreading sequence;

a first mixer for modulating said filtered I channel spreading sequence and producing a modulated I output signal;

Q channel short code generator means for receiving a universal time input and creating a Q channel spreading sequence at said time offset;

a second baseband filter for receiving said Q channel spreading sequence and providing a filtered Q channel spreading sequence;

a second mixer for modulating said filtered Q channel spreading sequence and producing a modulated Q output signal;

a summer for summing said modulated I output signal and said modulated Q output signal to produce a summed modulated signal; and upconversion and amplification means for receiving said summed modulated signal and producing said transmit pilot signal.

7. The cellular communication system of claim 6 wherein at least one base station of said first plurality of base stations comprises multiple sectors and wherein each sector of said at least one base station transmits a unique one of said identifying pilot signal.

8. The cellular communication system of claim 7 wherein at least one base station of said border set comprises multiple sectors and wherein each sector of said at least one base station of said border set transmits an identical one of said transmit pilot signal.

9. The cellular communication system of claim 6 wherein at least one base station of said border set comprises a second self contained pilot generator for providing a second transmit pilot signal having a time offset different from said time offset of said self contained pilot generator.

10. A cellular communication system comprised of a plurality of base stations and a plurality of mobile units wherein said plurality of mobile units may handoff operation from one base station to another base station during an active call, said system comprising:

a first group of said plurality of base stations for communicating active call signals with said plurality of mobile units using a spreading sequence to modulate said active call signals and for transmitting a base station reference signal;

a first mobile unit for monitoring said base station reference signals to assist in handoff from a first base station of said first group of said plurality of base stations to a subsequent base station and for transmitting an indication signal based on said base station reference signal to said first base station;

a first system controller for controlling said first group of said plurality of base stations and for receiving from said first base station said indication signal from said first mobile unit; and a second group of said plurality of base stations for communicating active calls with said plurality of mobile units using an alternative modulation technique and for transmitting a base station reference signal analogous to said base station reference signals transmitted by said first group of said plurality of base stations;

wherein said subsequent base station may be a member of said first group or said second group of said plurality of base stations.

11. A method of communicating with at least one remote unit using a cellular communication system comprised of a first plurality of base stations for communication using a first modulation technique and a second plurality of base stations for communication using a second modulation technique, said method comprising the steps of:

transmitting according to said first modulation technique an identification signal from each base station in said first plurality of base stations;

transmitting according to said first modulation technique said identification signal from each base station in said second plurality of base stations which is adjacent to a base station of said first set of base stations; and determining from said identification signals whether to initiate a change from communication in said first plurality of base stations to communication in said second plurality of base stations.

12. The method of claim 3 further including the step of receiving at said first mobile unit said synchronization channel signal and selecting a mode of operation in response thereto.

13. The method of claim 12 wherein said step of transmitting a message from said first mobile unit to a CDMA system controller includes the step of indicating receipt of said first pilot signal at a signal level in excess of a predefined qualifying signal level.

* * * * *

Adverse Decisions In Interference

Patent No. 5,594,718, Lindsay A. Weaver, Jr, Gwain Bayley, Edward G. Tiedemann Jr, Klein S. Gilhousen, METHOD AND APPARATUS FOR PROVIDING MOBILE UNIT ASSISTED HARD HANDOFF FROM A CDMA COMMUNICATION SYSTEM TO AN ALTERNATIVE ACCESS COMMUNICATION SYSTEM, Interference No. 104,005, final judgment adverse to the patentees rendered September 11, 1998, as to clahns 1-13.

*(Official Gazette October 27, 1998)*